(12) United States Patent
Kikukawa et al.

(10) Patent No.: US 11,051,575 B2
(45) Date of Patent: Jul. 6, 2021

(54) INFORMATION PROCESSING SYSTEM, INFORMATION PROCESSING METHOD, AND INFORMATION PROCESSING PROGRAM

(71) Applicant: NO NEW FOLK STUDIO INC., Tokyo (JP)

(72) Inventors: Yuya Kikukawa, Tokyo (JP); Takaharu Kanai, Tokyo (JP)

(73) Assignee: NO NEW FOLK STUDIO INC., Tokyo (JP)

( * ) Notice: Subject to any disclaimer, the term of this patent is extended or adjusted under 35 U.S.C. 154(b) by 0 days.

(21) Appl. No.: 16/499,821

(22) PCT Filed: Mar. 28, 2018

(86) PCT No.: PCT/JP2018/012986
§ 371 (c)(1),
(2) Date: Sep. 30, 2019

(87) PCT Pub. No.: WO2018/181584
PCT Pub. Date: Oct. 4, 2018

(65) Prior Publication Data
US 2020/0022448 A1     Jan. 23, 2020

(30) Foreign Application Priority Data

Mar. 28, 2017   (JP) .............................. JP2017-063272

(51) Int. Cl.
*A43B 3/00*      (2006.01)
*A43B 13/38*     (2006.01)
(Continued)

(52) U.S. Cl.
CPC ............ *A43B 3/0005* (2013.01); *A43B 13/38* (2013.01); *G02B 27/017* (2013.01); *G06F 3/011* (2013.01)

(58) Field of Classification Search
CPC ... A43B 3/0005; A43B 3/0001; A43B 3/0021; G06F 3/011
See application file for complete search history.

(56) References Cited

U.S. PATENT DOCUMENTS 6,837,827 B1 * 1/2005 Lee .................... A63B 24/0084
                                                                    482/8
7,602,301 B1 * 10/2009 Stirling ................ A61B 5/1124
                                                                    340/573.1
(Continued)

FOREIGN PATENT DOCUMENTS

JP          7200162 A       8/1995
JP       2005218757 A       8/2005
(Continued)

OTHER PUBLICATIONS

JP Application No. 2017063272 Office Action dated Dec. 17, 2019.
(Continued)

*Primary Examiner* — Ryan R Yang
(74) *Attorney, Agent, or Firm* — Alston & Bird LLP

(57) ABSTRACT

In an information processing system comprising footwear and an information processing device, the footwear is provided with a sensor to detect a motion of the footwear, the information processing system includes: a detection unit configured to detect the motion of the footwear on the basis of a temporal change of the sensing data; and a generation unit configured to generate space information to be provided to a user wearing the footwear according to the motion detected by the detection unit; and the information processing device is provided with an output unit configured to output the space information.

17 Claims, 10 Drawing Sheets

(51) Int. Cl.
*G02B 27/01* (2006.01)
*G06F 3/01* (2006.01)

(56) References Cited

U.S. PATENT DOCUMENTS

| | | | | |
|---|---|---|---|---|
| 2004/0212317 | A1* | 10/2004 | Weng | H05B 47/155 |
| | | | | 315/200 A |
| 2007/0231778 | A1* | 10/2007 | Kim | A63B 69/00 |
| | | | | 434/250 |
| 2011/0306299 | A1* | 12/2011 | Wells | A43B 3/0021 |
| | | | | 455/41.3 |
| 2013/0041617 | A1* | 2/2013 | Pease | A61B 5/02438 |
| | | | | 702/139 |
| 2014/0123838 | A1* | 5/2014 | D'Amours | G10H 1/0083 |
| | | | | 84/626 |
| 2014/0336796 | A1* | 11/2014 | Agnew | G09B 5/06 |
| | | | | 700/91 |
| 2014/0364197 | A1* | 12/2014 | Osman | A63F 13/497 |
| | | | | 463/24 |
| 2016/0342201 | A1* | 11/2016 | Jehan | A61B 5/024 |
| 2017/0055880 | A1* | 3/2017 | Agrawal | A61B 5/7405 |
| 2017/0109916 | A1* | 4/2017 | Kurz | G06T 19/006 |
| 2017/0109936 | A1* | 4/2017 | Powderly | G06F 3/0482 |
| 2017/0336870 | A1* | 11/2017 | Everett | G06F 3/017 |
| 2018/0012417 | A1* | 1/2018 | Haseltine | A63F 13/211 |
| 2018/0299271 | A1* | 10/2018 | Calloway | G01C 21/20 |

FOREIGN PATENT DOCUMENTS

| | | |
|---|---|---|
| JP | 2005293413 A | 10/2005 |
| JP | 2006091313 A | 4/2006 |
| JP | 2008049117 A | 3/2008 |
| JP | 2013172432 A | 9/2013 |
| JP | 2016525917 A | 9/2016 |
| WO | WO 2016061699 A1 | 4/2016 |
| WO | WO 2018181584 A1 | 10/2018 |

OTHER PUBLICATIONS

JP Application No. 2017063272 Office Action dated Aug. 6, 2019.
WIPO Application No. PCT/JP2018/012986, International Search Report, dated Jun. 12, 2018.
WIPO Application No. PCT/JP2018/012986, Written Opinion of the International Searching. Authority, dated Jun. 12, 2018.

* cited by examiner (a)

(b)

(a)

(b)

(c)

(a)

(b)

(a)

(b)

INFORMATION PROCESSING SYSTEM, INFORMATION PROCESSING METHOD, AND INFORMATION PROCESSING PROGRAM

CROSS REFERENCE TO RELATED APPLICATIONS

This application is a national stage entry of PCT/JP2018/012986 filed Mar. 28, 2018, which claims priority to Japanese application no. 2017-063272 filed Mar. 28, 2017, the contents of all of which are incorporated herein by their entirety.

TECHNICAL FIELD

The present invention relates to an information processing system, an information processing method, and an information processing program in which input using footwear is performed.

BACKGROUND ART

Conventionally, research on various input devices has been developed. As a general input device, for example, a controller that is operated by hand is well known, and is used in various fields. Patent Literature 1 discloses a technique for detecting a user's motion and using the user's motion as an input to a tennis game.

CITATION LIST

Patent Literature

[Patent Literature 1]
Japanese Unexamined Patent Application No. 2005-218757

SUMMARY OF INVENTION

Technical Problem

By the way, in the technique described in Patent Literature 1, there is a problem that a user has various complications, such as attaching a marker to the user's wrist or ankle, or preparing a plurality of cameras for imaging the user for using the technique.

Therefore, the present invention has been made in view of the above problems, and an object of the present invention is to provide an information processing system in which a user can perform an operation using an operation familiar to daily life with a simpler configuration.

Solution to Problem

In order to solve the above problems, an information processing system according to an aspect of the present invention is an information processing system including footwear and an information processing device, and the footwear is provided with a sensor to detect a motion of the footwear, the information processing system include a detection unit configured to detect the motion of the footwear on the basis of a temporal change of the sensing data, and a generation unit configured to generate space information to be provided to a user wearing the footwear according to the motion detected by the detection unit, and the information processing device is provided with an output unit configured to output the space information.

In order to solve the above-described problem, an information processing method according to an aspect of the present invention includes a receiving step of receiving from the footwear sensing data of a sensor for detecting detected motion of the footwear, the sensor being provided in the footwear, a detecting step of detecting the motion of the footwear on the basis of a temporal change of the sensing data, a generating step of generating space information to be provided to the user wearing the footwear according to the motion detected in the detecting step, and an outputting step of outputting the space information.

In order to solve the above-described problem, an information processing program according to an aspect of the present invention causes a computer to realize a receiving function for receiving from the footwear sensing data of a sensor for detecting detected motion of the footwear, the sensor being provided in the footwear, a detecting function for detecting the motion of the footwear on the basis of the temporal change of the sensing data, a generating function for generating space information to be provided to a user wearing the footwear according to the motion detected by the detecting function, and an outputting function for outputting the space information.

In the information processing system, the footwear may further include a transmission unit configured to transmit sensing data detected by the sensor to the information processing device, and the information processing device further includes a reception unit configured to receive the sensing data, the detection unit, and the generation unit.

In the information processing system, the output unit may be a monitor, the space information may be image information indicating a virtual reality space or an augmented reality space, and the generation unit generates, as the image information, an image indicating a character operated by the user or a view shown in the field of view of the user.

In the information processing system, the information processing device may include an acceptation unit configured to accept designation information for designating whether the generation unit generates the space information for the virtual reality space or the space information for the augmented reality space as the space information generated by the generation unit, and the generation unit generates space information according to the designation information.

In the information processing system, the information processing device may further include a position information acquisition unit configured to acquire position information indicating a current position of the own device a designation information generation unit configured to generate designation information for designating generation of space information for the virtual reality space when the position information is included within a predetermined range that is determined in advance, and configured to generate designation information for designating generation of space information for the augmented reality space when the position information is not included within a predetermined range that is determined in advance, and the acceptation unit accepts the designation information generated by the designation information generation unit.

In the information processing system, the information processing system may include another information processing device, a designation information generation unit configured to generate designation information that designates whether the generation unit generates space information for augmented reality space, or the space information for the virtual reality space according to whether the device using the space information generated by the generation unit is the information processing device or the other information processing device, and the acceptation unit accepts the designation information generated by the designation information generation unit.

In the above information processing system, the generation unit may generate the space information using different conversion coefficients between the sensing data and the virtual reality space and the augmented reality space according to the designation information.

In the information processing system, the generation unit may generate image information of an interaction with an object that appears in the virtual reality space or the augmented reality space according to the motion of the footwear.

In the above information processing system, the information processing device may be a wearable terminal used by a user wearing on a head thereof.

In the information processing system, the output unit is a speaker, and the space information may be audio information emitted in a virtual reality space or an augmented reality space.

In the information processing system, the generation unit may specify the type of the user's motion, and generates the audio information according to the degree of appropriateness as the specified type of motion from the motion of the footwear detected by the detection unit.

In the information processing system, the information processing device may include a storage unit configured to store music information for at least one music and example information that serves as an example of motion for each type of motion, and the generation unit may generate, as the space information, space information indicating more correct music as the music information as the motion of the footwear is closer to an ideal walking motion, and may generate space information indicating a music with more noise added to the music information as the sensing data is farther from the ideal walking motion.

In the information processing system, the space information may include image information indicating the virtual reality space or the augmented reality space, the image information includes an object to be displayed in the virtual reality space or the augmented reality space, and the generation unit may generate space information including the predetermined audio when a character operated by the user or the user touches the object according to the motion of the footwear.

In the information processing system, the generation unit may generate music, as the space information, as the audio information according to the motion of the footwear, and changes the music tone of the music according to the predetermined motion of the footwear.

In the information processing system, the information processing system may further include an external device, the external device may include an acquisition unit configured to acquire information about the user, a transmission unit configured to transmit information about the user acquired by the acquisition unit to the information processing device, and the generation unit may further generate the space information on the basis of information about the user transmitted from the external device.

In the information processing system, the acquisition unit may acquire information related to a motion of parts other than foot of the user.

In the information processing system, the footwear may further include a light emitting unit configured to emit light according to the motion of the footwear, and the generation unit may generate space information indicating that the footwear worn by the character of the user in the virtual space is caused to emit light in the same manner as the light emitting unit.

In the information processing system, the generation unit may generate the space information including stimulus information for specifying a stimulus to be given to the user according to an action to a character operated by the user or the user in the virtual reality space or the augmented reality space, and the footwear may include a reception unit configured to receive the space information including the stimulus information, and a stimulus unit that gives a bodily sensation stimulus to the user on the basis of the stimulus information.

Advantageous Effects of Invention

The information processing system and the like according to one aspect of the present invention can generate space information corresponding to the motion of footwear. Therefore, a user can cause the footwear to function as an input device only by moving the footwear. For example, just by raising and lowering the footwear, it is possible to generate a view ahead as space information and provide the view to the user, assuming that the character corresponding to the user has advanced. Since the input is performed using what is normally used by the user, such as footwear, the input can be performed without performing complicated processing for the user.

DESCRIPTION OF EMBODIMENTS

Hereinafter, an information processing system according to an embodiment of the present invention will be described in detail with reference to the drawings.

Embodiment

<Configuration>

Figure 1:
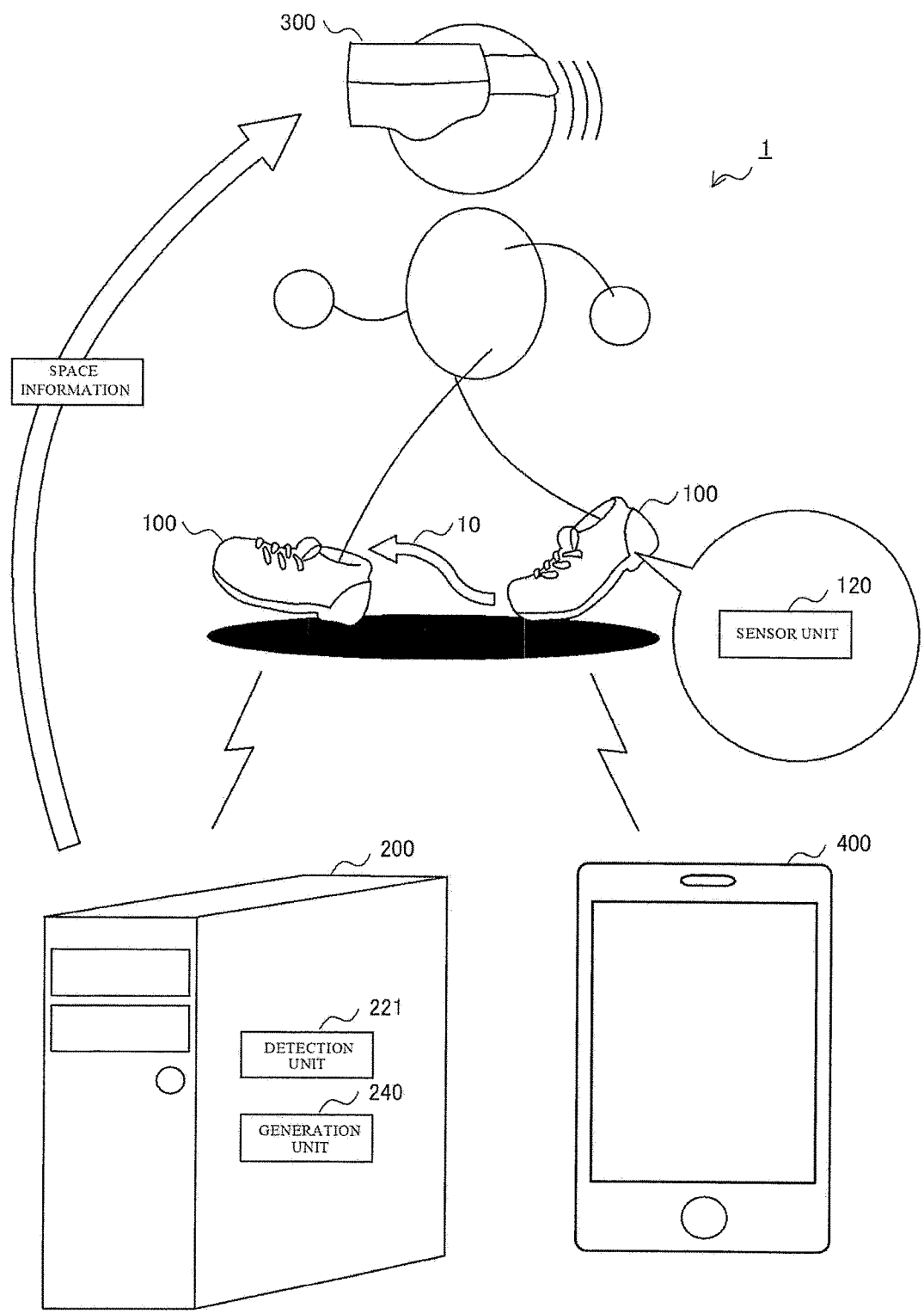
FIG. 1 is a schematic view showing an outline of an information processing system.

FIG. 1 is a schematic diagram showing an outline of an information processing system. As illustrated in FIG. 1, the information processing system 1 includes footwear 100 and may include a first information processing device 200, a second information processing device 300, and a user terminal 400.

The footwear 100 includes a sensor unit 120. The footwear 100 is worn on feet of a user, and is, for example, sneakers, leather shoes, pumps, sandals, but is not limited thereto. The footwear 100 has a space for placing at least the sensor unit 120.

The sensor unit 120 is a sensor having a function of detecting the motion of the footwear 100 when the user wears the footwear 100 and moves. Detecting the motion of the footwear 100 allows detection of the motion of the foot of the user. The sensor unit 120 can be realized from, for example, an accelerator that detects acceleration of three axes (for example, two axes perpendicular to each other in the horizontal plane and an axis perpendicular to the two axes) and an angular velocity sensor for detecting rotation angles of the three axes. The sensor unit 120 may further include a geomagnetic sensor that detects the geomagnetism in the three-axis direction, and may function as a nine-axis sensor. Hereinafter, the sensing data detected by the sensor unit 120 is referred to as sensing data. The sensing data includes at least triaxial acceleration information and triaxial angular velocity information.

The information processing system 1 includes a detection unit 211 and a generation unit 212.

The detection unit 211 detects the motion of the footwear 100 on the basis of the temporal change of the sensing data detected by the sensor unit 120 of the footwear 100. The detection unit 211 is realized by, for example, the processor of the first information processing device 200, but is not limited thereto. The detection unit 211 may be realized by the processor of the footwear 100, may be realized by the processor of the second information processing device 300, or may be realized by the processor of the user terminal 400.

The generation unit 212 generates space information to be provided to the user wearing the footwear 100 according to the motion detected by the detection unit 211. The generation unit 212 is realized by, for example, the processor of the first information processing device 200, but is not limited thereto. The generation unit 212 may be realized by the processor of the footwear 100, may be realized by the processor of the second information processing device 300, or may be realized by the processor of the user terminal 400. Here, the space information refers to information related to a virtual reality space or an augmented reality space, and includes image information and audio information including still images and moving images.

The second information processing device 300 includes an output unit that outputs the space information generated by the generation unit 212. The output unit may be realized by a display device that displays an image or a speaker that outputs sound.

Therefore, the information processing system 1 can provide the user with the space information generated by the motion of the footwear 100 moved by the user. For example, the information processing system 1 can move the character in the virtual reality space according to the motion of the footwear 100 to provide a view of the viewpoint of the character, provide footsteps according to the motion of the footwear 100, provide music corresponding to the rhythm of the motion of the footwear 100.

The information processing system as described above will be described in more detail. Here, an example in which the first information processing device 200 generates space information will be described. However, as described above, the space information may be generated by the footwear 100, may be generated by the second information processing device 300, or may be generated by the user terminal 400. That is, the first information processing device 200 may be included in the footwear 100, the second first information processing device 200, or the user terminal 400. In addition, the functions of the detection unit 211, the generation unit 212, and the like realized by the first information processing device 200 may be separately from each other mounted on another device as long as the motion information of the detection unit 211 can be transmitted to the generation unit 212.

Figure 2:
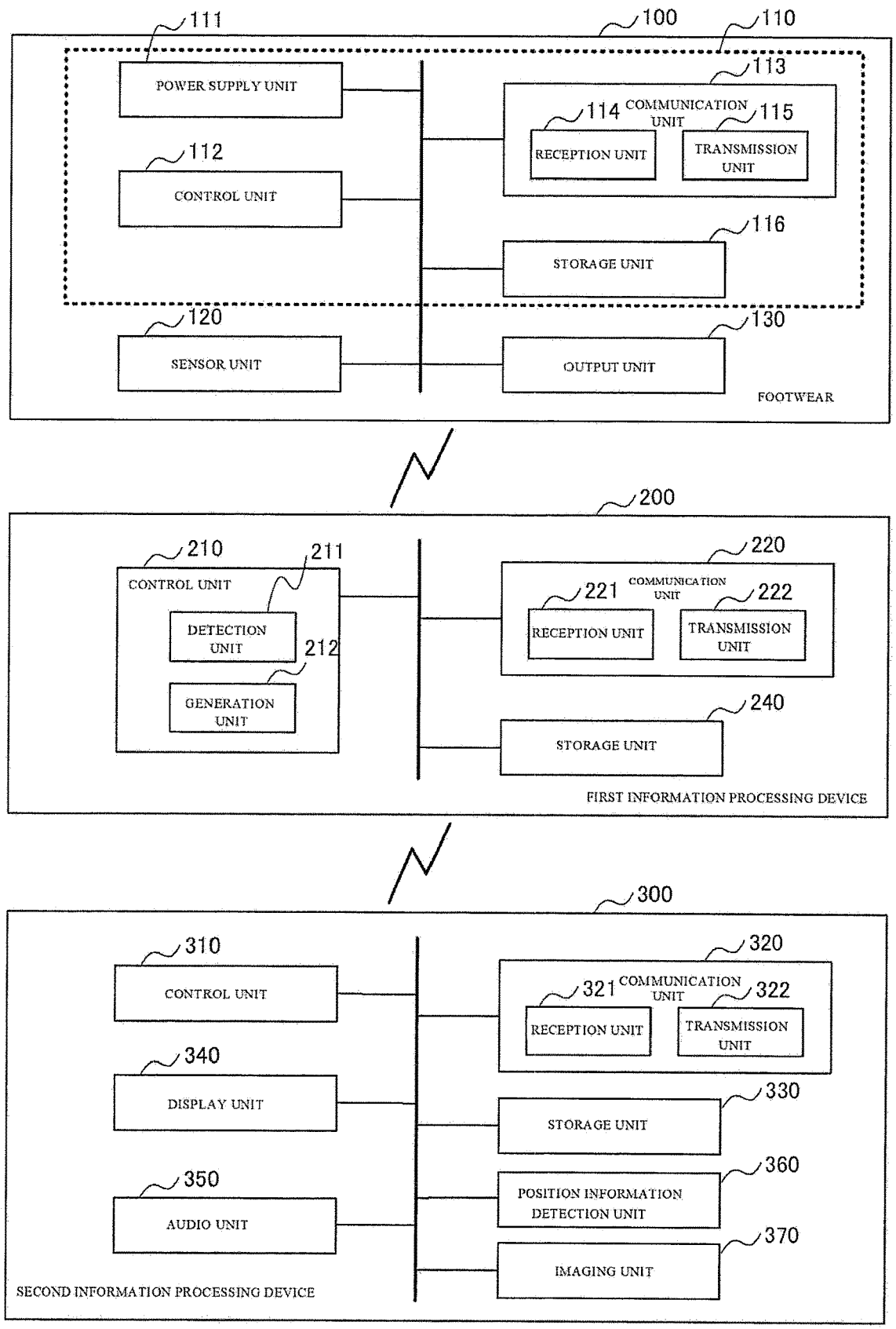
FIG. 2 is a block diagram showing an example of the configuration of the information processing system and the functional configuration of each device constituting the system.

FIG. 2 is a system diagram showing a configuration of the information processing system, and at the same time, a block diagram showing a functional configuration of each device constituting the information processing system 1.

As shown in FIG. 2, the footwear 100 executes communication with the first information processing device 200. In addition, the first information processing device 200 performs communication with the second information processing device 300.

As shown in FIG. 2, the footwear 100 includes at least the sensor unit 120, and may include the module 110 and the output unit 130. The module 110, the sensor unit 120, and the output unit 130 are connected via a bus. The connection may be a wired or wireless connection, as long as information can be transmitted to each other. Note that the sensor unit 120 and the output unit 130 may be configured to be connected via the module 110.

The module 110 includes a power supply unit 111, a control unit 112, a communication unit 113, and a storage unit 116.

The power supply unit 111 is a battery having a function of supplying driving power to each unit constituting the footwear 100.

The control unit 112 is a processor having a function of controlling each part of the footwear 100. The control unit 112 controls each unit of the footwear 100 by executing a control program stored in the storage unit 116. The control unit 112 requests the communication unit 113 to transmit the sensing data transmitted from the sensor unit 120 to the first information processing device 200. Further, the control unit 112 causes the output unit 130 to emit light in accordance with the control signal received by the communication unit 113.

The communication unit 113 is a communication interface having a function of executing communication with the first information processing device 200. The communication unit 113 includes a reception unit 114 and a transmission unit 115 (first transmission unit). The communication unit 113 communicates with the first information processing device 200 by wireless communication. The communication unit 113 may communicate with any communication standard as long as it can communicate with the first information processing device 200. Examples of communication standards may be used by the communication unit 113 include Bluetooth Low Energy (registered trademark), Bluetooth (registered trademark), 3G (3rd Generation), 4G (4th Generation), LTE (Long Term Evolution), Wi-fi, and the like. As a communication standard used by the communication unit 113, it is desirable to use a communication standard that requires a small amount of power consumption for communication when communicating with the first information processing device 200.

The reception unit 114 receives a control signal for controlling the output unit 130 from the first information processing device 200. The reception unit 114 transmits the received control signal to the control unit 112.

The transmission unit 115 transmits sensing data indicating the motion of the footwear 100 detected by the sensor unit 120 to the first information processing device 200.

The sensor unit 120 detects the motion detected when the user wearing the footwear 100 moves. As described above, the sensor unit 120 detects at least triaxial acceleration and angular velocity information indicating the rotation angle of the three axes, and transmits the detected data to the control unit 112 as sensing data. In addition to the nine-axis sensor, the sensor unit 120 may include a temperature sensor, a humidity sensor, and a pressure sensor, and the sensing data thereof is also transmitted to the control unit 112. The temperature sensor detects the temperature of the foot of the user. The humidity sensor detects the humidity in the footwear 100. A pressure sensor is provided in the bottom face of the footwear 100, for example, and detects how a user applies force with respect to the bottom face of a foot.

The output unit 130 performs output on the basis of the control signal received by the reception unit 114 of the communication unit 113 in accordance with an instruction from the control unit 112. Here, the output unit 130 emits light, and is realized by an LED, for example. The LED can emit a plurality of colors, and emits light in the emission color and emission pattern indicated by the control signal. Note that the light emitted by the output unit 130 may simply be light that matches the music output by the first information processing device 200, or light that matches the motion of the footwear 100. The output unit 130 may output sound in addition to light.

Figure 3:
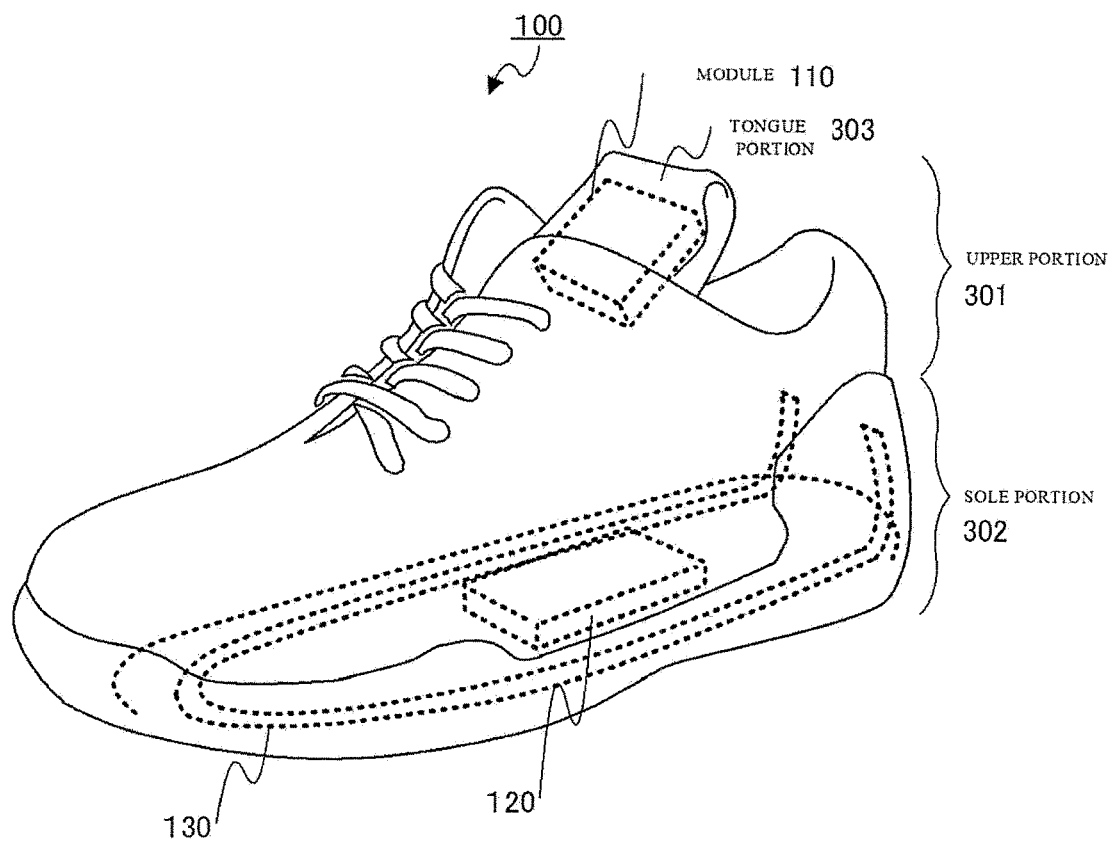
FIG. 3(a) is an external view showing the appearance of the footwear.
FIG. 3(b) is an external view showing the structure of a tongue portion.
Figure 3:
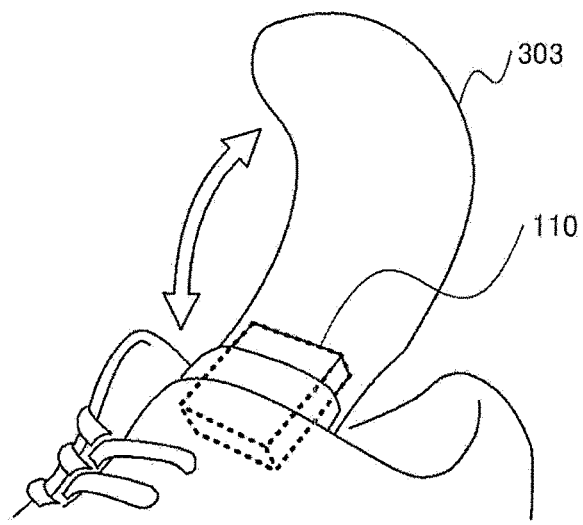

Here, an example of the appearance of the footwear 100 and the arrangement and structure of each part will be described. FIG. 3 is an example of the footwear 100, and is a diagram illustrating an appearance thereof and an example of arrangement of each part inside.

FIG. 3(*a*) is an external view showing the configuration of the footwear 100. As shown in FIG. 3(*a*), the footwear 100 is configured with an upper portion 301 that is arranged on the upper surface side of the footwear 100, and covers and fixes the instep of the user wearing the footwear 100, and a sole portion 302 that is arranged on the bottom surface side of the footwear 100 and has a function of absorbing impact. The upper portion 301 is provided with a tongue portion 303 for protecting the instep of the user. The tongue portion 303 is provided with a module 110. As shown in FIG. 3(*b*), the tongue portion 303 is opened to allow the module 110 inserted in the pocket provided in the tongue portion 303 is exposed. Although not shown, the module 110 has a terminal (for example, a USB terminal) for receiving power supply, and as shown in FIG. 3(*b*), the tongue portion 303 is opened to allow connection of the terminal to an external power source and receiving power supply to store the power in the power supply unit 111.

In the footwear 100, the sole portion 302 includes the output unit 130 and the sensor unit 120 as described above. The sensor unit 120 is provided inside the shank unit in the sole portion 302 at a position corresponding to the arch of the foot of the user. Although not shown, the sensor unit 120 is connected to the module 110 through the inside of the footwear 100, operates with power supplied from the power source unit 111 inside the module 110, and sensor data (sensing data) to the module 110. Thereby, the sensing data detected by the sensor unit 120 is transmitted to the external first information processing device 200 by the communication unit 113.

Figure 4:
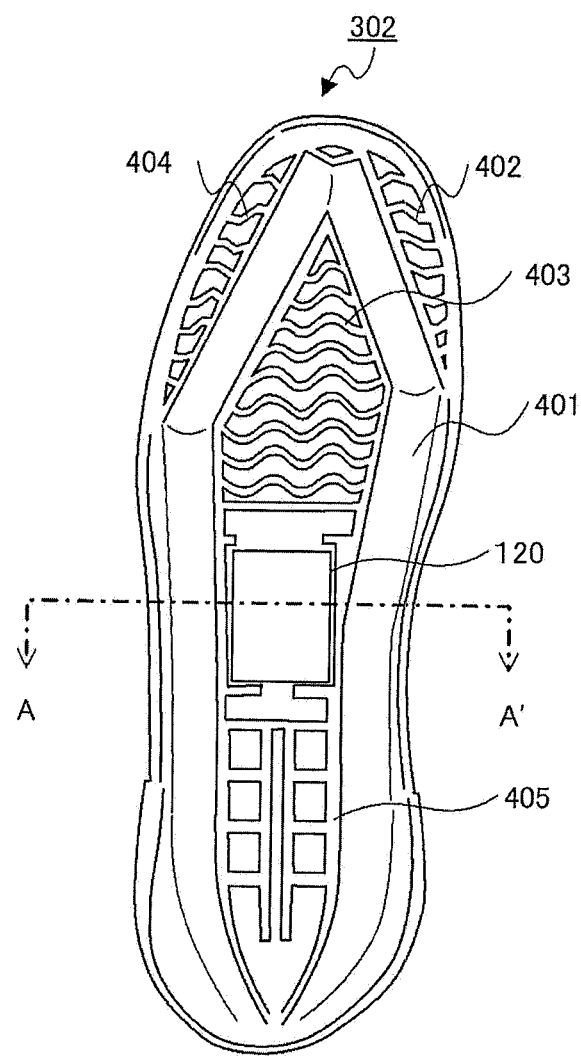
FIG. 4(a) is a plan view of the sole portion.
FIG. 4(b) is a sectional view of a sole portion, and FIG. (c) is a sectional view of a sole portion, and a sectional view showing an example in which an output unit is arranged.
Figure 4:
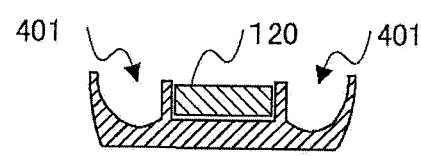
Figure 4:
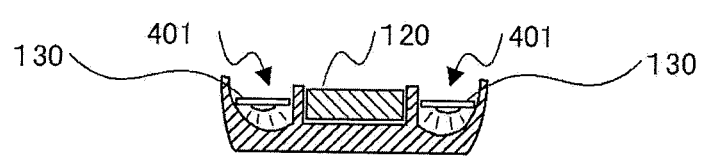

FIG. 4(*a*) is a plan view of the sole portion 302, and FIG. 4(*b*) is a cross-sectional view of the sole portion 302 of FIG. 4(*a*) taken along the line A-A'. As shown in FIG. 4(*a*), the sole portion 302 includes a groove portion 401 for placing the output unit 130. The groove portion 401 is provided in the outer peripheral portion of the sole portion 302 inside the sole portion 302 and along the outer edge thereof. The groove portion 401 is recessed for placing the output unit 130, and an LED tape is provided in the groove portion 401 as the output unit 130. As shown in FIG. 4(*a*), the sensor unit 120 is provided at a position where the groove portion 401 is not provided and at a position facing the user's arch inside the sole portion 302. The location is a position referred to as a so-called shank portion in the structure of the footwear 100. In the sole portion 302, ribs for shock absorbing 402 to 405 are provided at positions where the groove portion 401 and the sensor unit 120 are not provided. The ribs 402 and 403 are provided on the toe side of the user of the sole portion 302 and on the outer peripheral side of the groove portion 401. Accordingly, it is possible to absorb impact applied to the tip of the footwear 100 with respect to the footwear 100, reduce the possibility that the output unit 130 provided in the groove portion 401 breaks down, and reduce the burden on the foot of the user. Similarly, the ribs 404 and 405 are located in the center of the footwear 100, absorb the impact on the footwear, can reduce the possibility that the output unit 130 provided in the groove portion 401 break down, and reduce the burden on the foot of the user.

FIG. 4(*c*) is a cross-sectional view of the sole portion 302 and shows a state where an LED tape as the output unit 130 is placed. As shown in FIG. 4(*c*), the output unit 130 is placed with the light emitting surface facing the bottom surface side of the footwear 100. That is, the bottom surface of the footwear 100 emits light. The inventors have found that when the LED tape is installed along the side surface of the sole portion 302 so that the side surface emits light, breakage rate in the LED tape, particularly bending rate in the toe portion, increases and the breakage rate increases. Therefore, as a result of searching for the placement of the LED tape that further reduces the breakage rate, the inventors have conceived of a configuration in which the light emitting surface of the LED tape is placed toward the bottom surface side of the sole portion 302 as illustrated in FIG. 4(*c*). Since the sole portion 302 is made of a transparent or translucent resin having high shock absorption, the sole portion 302 that transmits light emitted from the LED tape and the footwear 100 that emits light from the bottom surface thereof can be provided.

Figure 5:
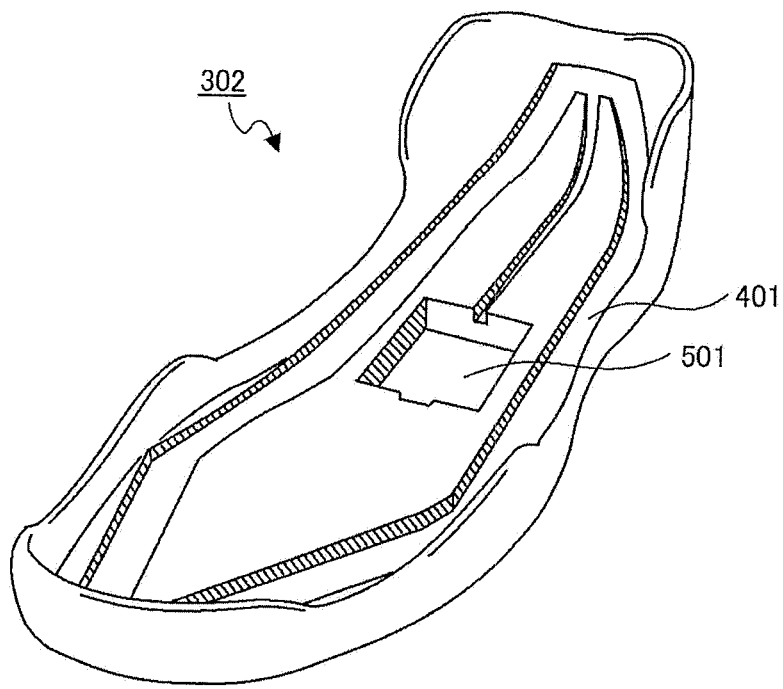
FIG. 5(a) is a perspective view of the sole portion.
FIG. 5(b) is a perspective view of a sole portion, which is a view showing a state in which the output unit 130 is arranged.
Figure 5:
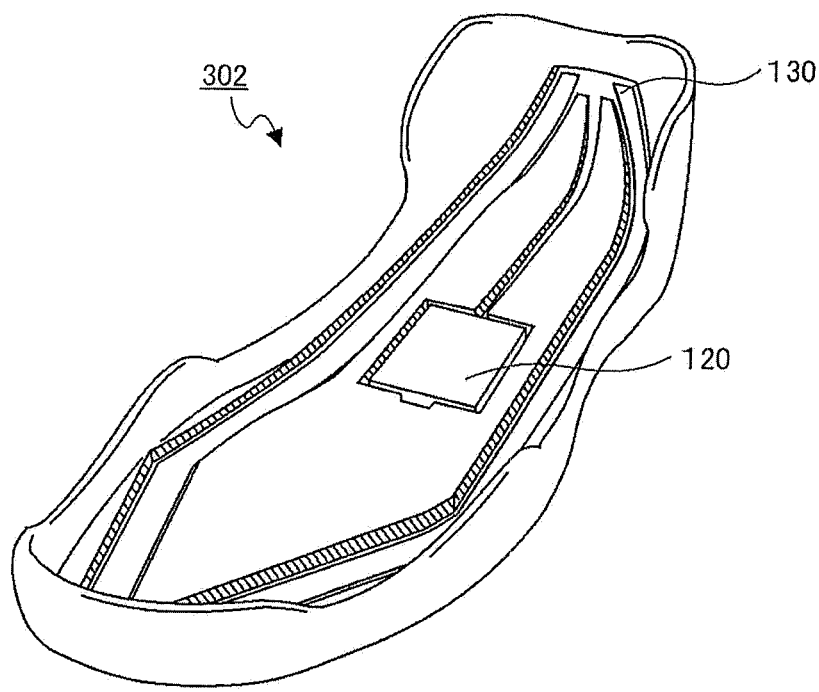

FIG. 5 is a perspective view of the sole portion 302 provided to make the structure of the sole portion 302 easier to understand. FIG. 5(*a*) is a perspective view showing a state in which the sensor unit 120 and the output unit 130 are not placed on the sole portion 302, and FIG. 5(*b*) is a perspective view showing a state in which the output unit 106 and the sensor unit 120 are placed. As can be understood by comparing FIG. 5(*a*) and FIG. 5(*b*), the output unit 130 that is an LED tape is placed on the groove portion 401 and provided on the outer peripheral portion of the bottom surface of the sole portion 302. In addition, the sensor unit 120 is provided in a dent 501 provided in the sole portion 302. The dent 501 is configured to substantially match the outer diameter of the sensor unit 120, thereby preventing rattling as much as possible when the sensor unit 120 is placed in the dent 501, and enabling pure detection of the motion of the footwear 100 detected by the sensor unit 120. In order to improve the accuracy of detecting the motion of the footwear 100, it is desirable to provide the sensor unit 120 on the sole portion 302. In the present embodiment, an example in which the footwear 100 emits light has been described as an example in which the footwear 100 outputs from the output unit 130. However, in the present embodiment, the main force unit 130 is not an essential configuration.

Returning to FIG. 2, the description returns to the first information processing device 200 and the second information processing device 300.

As shown in FIG. 2, the first information processing device 200 includes a control unit 210, a communication unit 220, a presentation unit 230, and a storage unit 240.

The control unit 210 is a processor having a function of controlling each unit of the first information processing device 200. The control unit 210 controls each unit of the first information processing device 200 by executing a control program stored in the storage unit 240. The control unit 210 functions as a detection unit 211 that detects the motion of the footwear 100 on the basis of the received sensing data. Further, the control unit 210 functions as a generation unit 212 that generates space information corresponding to the motion of the footwear 100 detected by the detection unit 211.

The detection unit 211 detects the motion of the footwear 100 on the basis of temporal changes in the received sensing data (changes in the position of footwear, changes in acceleration, changes in inclination, etc.). By detecting the motion of the footwear 100, the first information processing device 200 can utilize the motion of the footwear 100 as input data by the user to the virtual reality space or the augmented reality space.

The generation unit 212 generates space information corresponding to the motion of the footwear 100 detected by the detection unit 211. The space information is any information related to the virtual reality space or augmented reality space, and includes, for example, image information indicating the virtual reality space or augmented reality space, and audio information on the virtual reality space or augmented reality space, and the like, but is not limited thereto. Generating space information in accordance with the motion of the footwear 100 means generating image information indicating a view visually recognized by an operation target (for example, a character) operated by a user in a virtual reality space or an augmented reality space, or generating sound that can be heard by the operation target in the virtual reality space or in the augmented reality space. More specifically, when it is detected from the motion of the footwear 100 that the user walks or runs, this refers to generating an image showing the walking destination and the scenery of the destination or generating sound indicating sound that is heard by walking or running (for example, wind sound). Needless to say, the example shown here is an example, and the generation unit 212 generates various space information by using the motion of the footwear 100 as an input. Whether the generation unit 212 generates the space information for the virtual reality space or the space information for the augmented reality space depends on a predetermined setting or a user situation (for example, position of the second information processing device 300). Details will be described later. In addition, when generating an image for the augmented reality space, the generation unit 212 generates the image on the basis of the video imaged by the imaging unit 370 of the second information processing device 300.

The communication unit 220 is a communication interface having a function of executing communication with the footwear 100 and the second information processing device 300. The communication unit 220 includes a reception unit 221 and a transmission unit 222. The communication unit 220 communicates with the footwear 100 by wireless communication. In addition, the communication unit 220 communicates using the second information processing device 300 by wired communication or wireless communication. The communication unit 220 may communicate with any communication standard as long as the communication unit 220 can communicate with the footwear 100 and the second information processing device 300. For example, the communication unit 220 communicates according to a communication standard such as Ethernet (registered trademark) or Bluetooth Low Energy is performed. The reception unit 221 receives sensing data from the footwear 100 and transmits the sensing data to the control unit 210. Alternatively, the reception unit 221 receives position information and a captured image from the second information processing device 300 and transmits them to the control unit 210. In addition, the transmission unit 222 transmits the space information transmitted from the control unit 210 to the second information processing device 300.

The storage unit 240 is a recording medium having a function of storing various programs and data required for operation of the first information processing device 200. The storage unit 240 can be realized by, for example, an HDD, an SSD, a flash memory, or the like. The storage unit 240 stores a detection program in which a motion of the footwear 100 is detected on the basis of a temporal change in the state of the footwear 100 indicated by the sensing data transmitted from the footwear 100, and a generation program for generating images and audios in the virtual reality space and augmented reality space on the basis of the detected motion of the footwear 100. The storage unit 240 stores the transmitted sensing data in association with the detected date information.

Next, the second information processing device 300 will be described. As illustrated in FIG. 2, the second information processing device 300 includes a control unit 310, a communication unit 320, and a storage unit 330, and includes a display unit 350 and an audio unit 350 that function as an output unit.

The control unit 310 is a processor having a function of controlling each unit of the second information processing device 300. The control unit 310 controls each unit of the second information processing device 300 by executing a control program stored in the storage unit 330. The control unit 310 causes the display unit 340 and the audio unit 350, which are output units, to output images and audio in accordance with the transmitted space information.

The communication unit 320 is a communication interface having a function of executing communication with the plurality of first information processing devices 200. The communication unit 320 communicates with the first information processing device 200 by wired communication or wireless communication. The communication unit 320 may perform communication according to any communication standard as long as the communication unit 320 can communicate with the first information processing device 200.

For example, the communication unit 320 performs communication according to a communication standard such as Ethernet (registered trademark) or Bluetooth. Communication unit 320 includes a reception unit 321 and a transmission unit 322.

The reception unit 321 has a function of receiving space information from the first information processing device 200 and transmitting the space information to the control unit 310.

The transmission unit 211 has a function of transmitting the position information detected by the position information detection unit to the first information processing device 200.

The storage unit 330 is a recording medium having a function of storing various programs and data required for operation of the second information processing device 300. The storage unit 330 can be realized by, for example, an HDD, an SSD, a flash memory, or the like.

The display unit 340 is a monitor having a function of displaying space information that is image information in accordance with an instruction from the control unit 310. The image information may be 3D video or 2D video. The image information may be a still image or a moving image. The display unit 340 displays, for example, a view of the field of view of the user's character on the virtual reality space according to the motion of the footwear 100, or displays a view of the user's view on the augmented reality space in which an object is superimposed on the view of the user.

The audio unit 350 is a speaker having a function of outputting space information as audio information by sound in accordance with an instruction from the control unit 310. The audio unit 350 outputs sound corresponding to in a virtual reality space or augmented reality space the motion of the footwear 100, or outputs music in accordance with the motion of the footwear 100.

The position information detection unit 360 has a function of acquiring position information indicating the current position of the second information processing device 300. The position information is sequentially transmitted to the first information processing device 200 by the transmission unit 322. The position information detection unit 360 can be realized by an existing positioning system such as GPS or GNSS.

The imaging unit 370 has a function of capturing an image of a view that is outside the second information processing device 300 and in a direction the face of the user is facing. The video imaged by the imaging unit 370 is transmitted to the first information processing device 200 by the transmission unit 322 and used when generating image information for the virtual reality space.

The above is the description of each device related to the information processing system 1.

<Operation>

Figure 6:
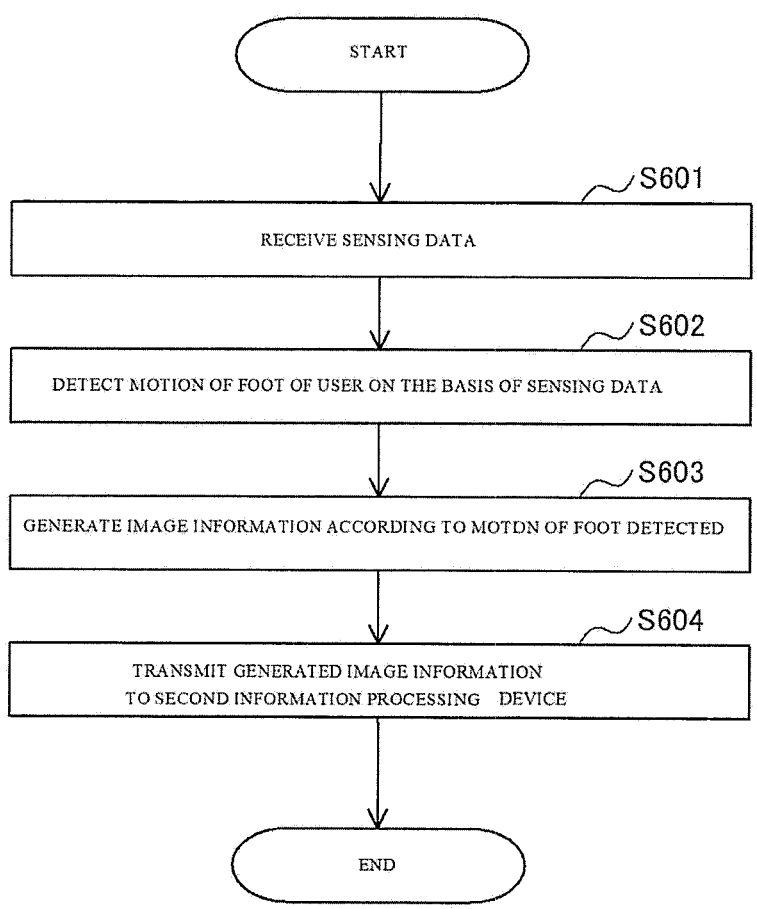
FIG. 6 is a flowchart showing an operation of a first information processing device 200 when generating image information.

From here, the operation of the first information processing device 200 in the information processing system will be described. FIG. 6 is a flowchart showing an operation when the first information processing device 100 generates image information related to the virtual reality space or the augmented reality space as the space information.

The sensor unit 120 of the footwear 100 transmits the detected information (sensing data) from the transmission unit 115 to the first information processing device 200. The reception unit 221 of the first information processing device 200 transmits the sensing data transmitted from the footwear 100 to the control unit 210 (step S601).

The detection unit 211 of the control unit 210 stores the transmitted sensing data in the storage unit 240. Then, on the basis of the sensing data stored in the storage unit 240 so far, the motion of the footwear 100 is detected by detecting temporal changes such as the position, orientation, and inclination of the footwear 100 (step S602). For example, the detection unit 211 detects from the change in the acceleration of the footwear 100 that the user has walked, detects that the user has raised his/her foot, or the footwear 100 is moving so as to draw an arc, thereby detecting that the user has kicked something. The detection unit 211 transmits motion information indicating the detected motion to the generation unit 212.

The generation unit 212 generates image information corresponding to the transmitted motion of the footwear 100, that is, the motion of the foot of the user. Here, the generation unit 212 generates image information for virtual reality space or augmented reality space (step S603). The process of which image information is generated will be described later. For example, when motion information indicating that the user has walked or raised or lowered his/her foot is transmitted, the generation unit 212 generates image information (video) indicating a state of moving forward by the distance calculated that the user's character has moved in the virtual reality space or augmented reality space. Alternatively, the generation unit 212, for example, when motion information indicating that the user has made a motion to kick something is transmitted, generates image information (video) indicating a state of kicking an object existing above the trajectory of the foot of the user in the virtual reality space or the augmented reality space. In addition, in the case where some effect is generated on an object in the virtual reality space or the augmented reality space according to the motion of the user (footwear 100), the generation unit 212 generates image information indicating the effect.

The control unit 210 transmits the image information which the generation unit 212 generated to the second information processing device 300 via the transmission unit 222 as space information (step S604).

With the configuration described above, the information processing system 1 can generate and output image information related to the virtual reality space or the augmented reality space according to the motion of the footwear 100.

Figure 7:
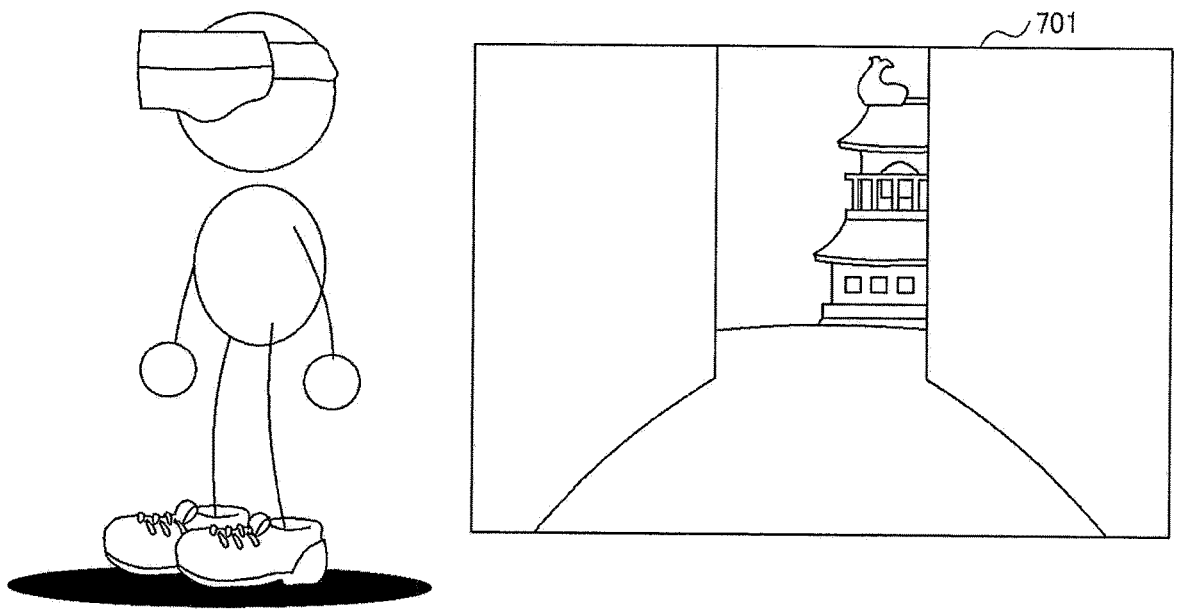
FIGS. 7(a) and (b) are diagrams showing display examples of image information generated by the first information processing device 200.
Figure 7:
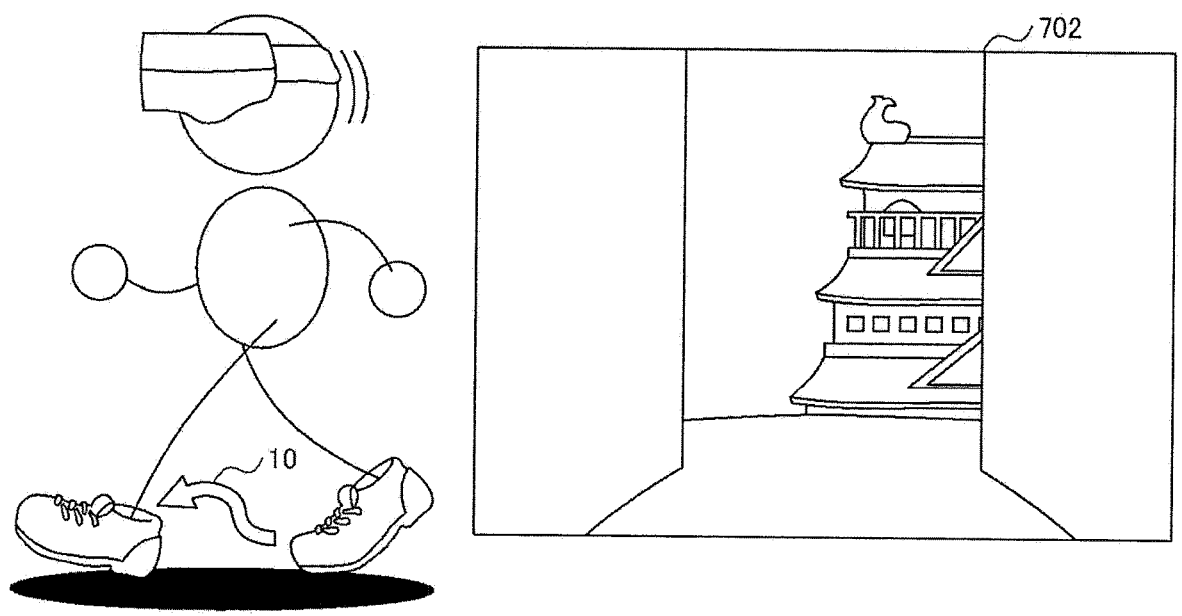

FIG. 7 shows a specific example when image information is output as space information. An image 701 in FIG. 7(a) shows an example of an image displayed on the second information processing device 300 (head mounted display) worn by the user. As shown in the image 701, in the virtual reality space or augmented reality space, it can be understood that the user's character or the user himself/herself is standing on the passage and can see a castle.

At this time, as shown in FIG. 7(b), it is assumed that the user walks using the footwear 100 or raises and lowers his/her foot. Then, the generation unit 212 generates, as space information, image information indicating a view where the user's character has advanced, and the display unit 350 of the second information processing device 300 displays an image as if the user is approaching a castle one step (or several steps) as shown in the image 702. Thus, in the information processing system 1, the footwear 100 can be used as an input device to operate a character and provide an image showing a view provided to the character. In addition, in order to appear a certain object (for example, a character other than the user) on the virtual reality space or the augmented reality space, to cause the user to follow the object, and to capture the object, generation unit 212 can cause the user to operate the footwear 100 or take an action using the footwear 100 (for example, kicking the object), and also generate an image corresponding to the action (for example, kicked or broken). Thus, in the information processing system 1, image information (video information) in the virtual reality space or augmented reality space using the sensing data of the footwear 100 as input information can be generated and provided to the user.

Figure 8:
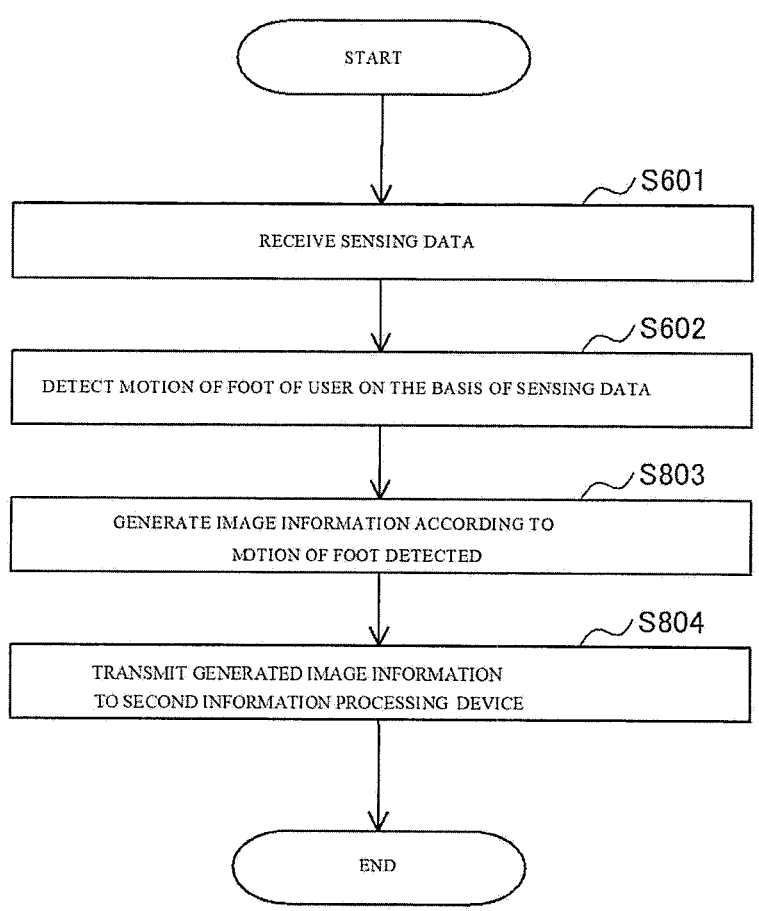
FIG. 8 is a flowchart showing an operation of the first information processing device 200 when generating audio information.

FIG. 8 shows the operation of the first information processing device 200 when generating audio information as the space information. FIG. 8 differs from FIG. 6 in that, instead of step S603, the generation unit 212 generates audio information as shown in step S803, and instead of step S604, the audio information generated by the generation unit 212 is transmitted to the second information processing device 300 as space information, as shown in step S804.

Operations other than that are basically the same as the operations shown in FIG. 6.

The generation unit 212 generates the audio information according to the motion of the footwear 100 (step S803). The generation of audio information according to the motion of the footwear 100 is generation of footsteps, generation of music according to the motion of the footwear 100, or generates sound that represents sound that should be heard with movement or sound of the destination audio according to the motion of the footwear 100 when the character corresponding to the user moves.

For example, music generated according to the motion of the footwear 100 is realized by selecting audio information so that a beautiful melody can be played by storing in advance in the storage unit 240, and when the motion of the footwear 100 indicates an ideal way of walking or an ideal motion in a certain motion. At this time, the ideal way of walking and motion is stored in the storage unit 240 as a predetermined example motion of walking way and motion, and it is assumed that the way of walking and motion is ideal as the way of walking and motion is closer to the example motion, and the farther away from the example motion, the more disturbing music for the user (for example, music with many dissonances) is generated as audio information. Instead of this example motion, the way of walking and motion may be detected by a predetermined algorithm whether the way of walking and motion is a desired motion.

The audio information generated in this way is output from the audio unit 350 of the second information processing device 300 worn by the user and provided to the user. Note that in FIGS. 6 and 8, the image information and the audio information have been described separately, but it goes without saying that both of them may be generated and provided to the user.

Figure 9:
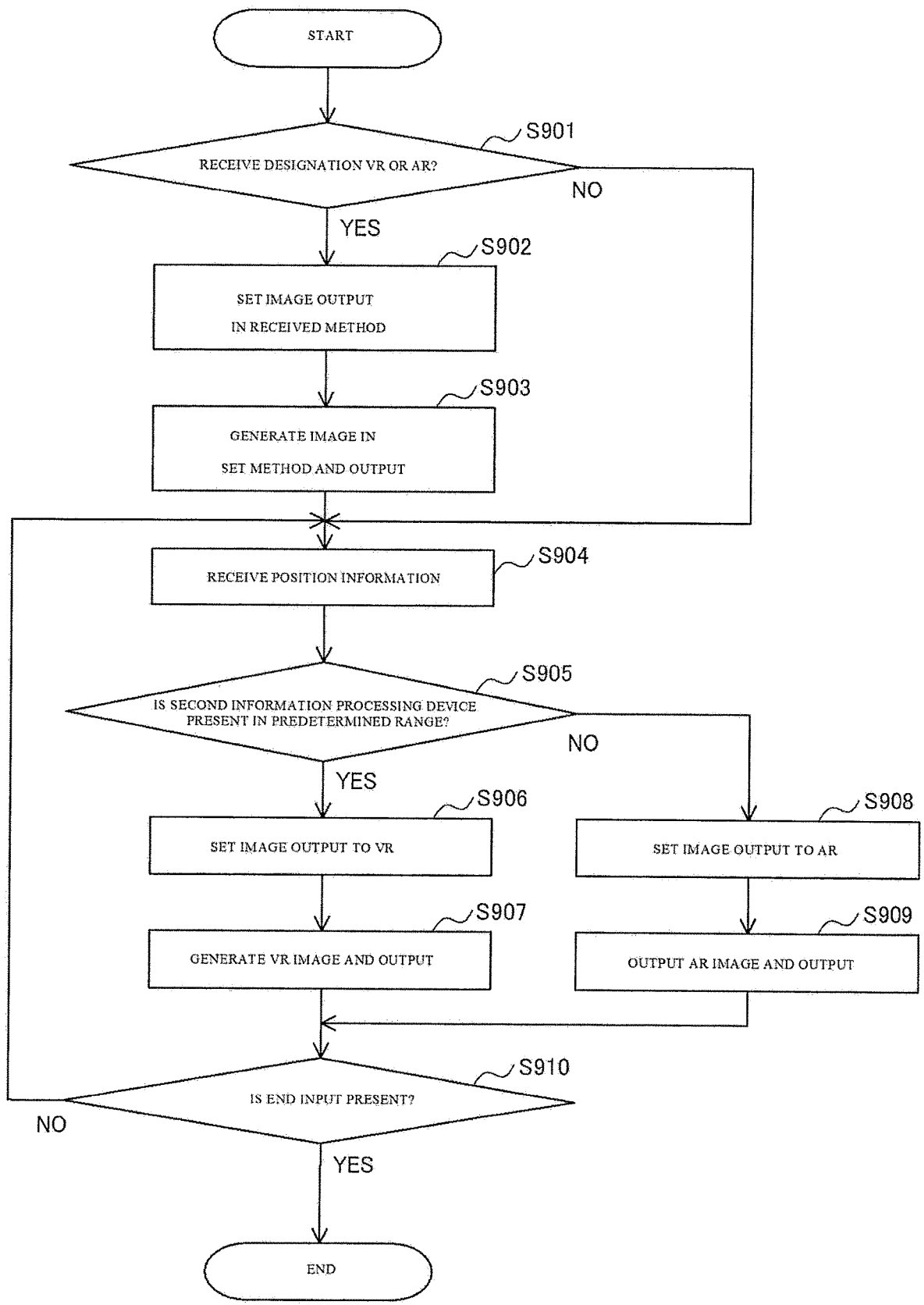
FIG. 9 is a flowchart showing an operation when the first information processing device 200 selects a virtual reality space or an augmented reality space.

FIG. 9 is a flowchart showing the setting of whether space information for the virtual reality space (VR) or space information for the augmented reality space (AR) is generated, and the operation of the first information processing device 200 related to switching. It is often considered that the space information for the virtual reality space and the space information for the augmented reality space have different scales in the space. Accordingly, the generation unit 212 generates space information for each space after processing to the sensing data from the footwear 100. For example, when generating the space information for augmented reality space, the generation unit 212 does not particularly process the sensing data. When generating the space information for virtual reality space, the generation unit 212 may multiply a predetermined coefficient to the sensing data to set so that the operation is exaggerated than that in augmented reality space. Here, the respective conversion coefficients may be the same or different. A conversion coefficient suitable for a desired augmented reality space or a desired virtual reality space may be used.

The control unit 210 of the first information processing device 200 detects whether a VR or AR designation input is received (step S901). For example, the input may be input from the second information processing device 300, or may be input by an input device (not shown) such as a keyboard connected to the first information processing device 200.

When the input for specifying VR or AR is received (YES in step S901), the control unit 210 sets the image output method to the designated method and stores the output image in the storage unit 240 (step S902). Then, the generation unit 212 generates and outputs an image (or sound) of the method set in the storage unit 240 (step S903).

On the other hand, the reception unit 221 of the first information processing device 200 receives the position information from the second information processing device 300 (step S904).

At this time, the control unit 210 of the first information processing device 200 detects whether the second information processing device 300 is within a predetermined range (for example, in the user's room) on the basis of the received position information (Step S905).

When the second information processing device 300 detects that is within the predetermined range (YES in step S905), the generation unit 212 determines that there is little risk even if space image for the virtual reality is provided to the user. Then, the image output format is set to VR (step S906). Note that the image output format here may prioritize the image output format set in the storage unit 240.

Then, the generation unit 212 generates a VR video and transmits the VR video to the second information processing device 300 (step S907). Thereby, the user is provided with a video of the virtual reality space (or an image in a format set in the storage unit 240).

On the other hand, when it is detected that the second information processing device 300 is not within the predetermined range (NO in step S905), the generation unit 212 determines that there is some danger if the user is viewing the virtual reality video (for example, hitting an object or a person), and sets the image output format to AR (step S908).

And the generation unit 212 generates the image information for augmented reality space, and transmits to the second information processing device 300 (step S909). Thereby, the user is provided with an image of the augmented reality space.

The control unit 210 of the first information processing device 200 determines whether or not an end input is received from the user (step S910). If the input is received (YES in step S910), the provision of the space information is ended, and if the input is not received (NO in step S910), the process returns to step S904.

As described above, in the information processing system 1, the space information for the virtual reality space and the space information for the augmented reality space can be switched and provided to the user. Moreover, according to a user's condition (position), switching to an augmented reality space can be performed so that a user can enjoy a content safely.

SUMMARY

In the information processing system 1, the user can enjoy the virtual reality space and the augmented reality space by using the motion of the footwear 100 as an input. For this purpose, the user does not need to put a special marker on the limb or install a camera. The user can enjoy a virtual reality space and/or an augmented reality space by using footwear that the user normally uses.

<Supplement>

It goes without saying that the device according to the above embodiment is not limited to the above embodiment, and may be realized by other methods. Hereinafter, various modifications will be described.

(1) Although not shown in the above embodiment, the output unit 130 of the footwear 100 may perform output other than light or sound.

For example, the output unit 130 may be realized by a vibrator and transmit vibration to the user. For example, the control unit 210 (generation unit 212) of the second information processing device 200 generates vibration information for vibrating the vibrator when the character's foot operated by the user or the character in the virtual reality space or augmented reality space comes into contact with any object in the virtual reality space or augmented reality space. Here, the vibration information may include information such as vibration intensity and vibration rhythm. Then, the control unit 210 transmits the generated vibration information to the communication unit 220, and causes the communication unit 220 to transmit the generated vibration information to the footwear 100. The reception unit 114 of the footwear 100 transmits the vibration information to the control unit 111. The control unit 111 controls the output unit 130 according to the transmitted vibration information to cause the vibrator to be vibrated.

Thereby, the information processing system 1 can make the user feel the impact and feel in the virtual reality space or augmented reality space.

Further, the output unit 130 may deform the footwear 110. For example, the footwear 100 may have a mechanism for pressing the user's leg. The mechanism may be, for example, a mechanical device configured to press the user's leg, or may utilize a material that expands due to a chemical reaction or an electrical reaction.

The output unit 130 may be realized by a heater that generates heat. For example, when the character is in a hot place in the virtual reality space, the heater may be operated to notify the user of the heat. Alternatively, in a virtual reality space, when a character receives an attack (for example, fire magic) from another character or object, the heater may be operated to transmit heat.

Alternatively, the output unit 130 may be realized by a cooler. For example, when the character is in a cold place in the virtual reality space, the cooler can be operated to inform the user of the cold. In fact, in the virtual reality space, when a character receives an attack (for example, ice magic) from another character or object, a cooler may be activated to transmit the cold.

As described above, the footwear 100 may have a function of transmitting feedback to the user's character or the user in the virtual reality space or the augmented reality space. Thereby, virtual reality space or augmented reality space can be made more realistic.

(2) As shown in the supplement (1) above, in a case in which a heater, a cooler, or the like may be mounted on the footwear 100, when the temperature sensor detects a temperature higher than a predetermined value or the humidity sensor detects a humidity higher than a predetermined value, the first information processing device 200 may output a cooling instruction to the cooler of the footwear 100, or when the temperature sensor detects a temperature below a predetermined value, a configuration in which a heating instruction is output to the heater of the footwear 100 may be employed.

(3) Although not specifically described in the above embodiment, when the output unit 130 of the footwear 100 causes the LED to emit light, the first information processing device 200 may also be configured to produce an effect of causing the footwear corresponding to the footwear 100 in the virtual reality space or the augmented reality space to emit light in the same manner. That is, the light emission of the actual footwear 100 and the light emission of the footwear 100 in the virtual reality space may be synchronized.

(4) The space information generated by the generation unit 212 shown in the above embodiment is an example, and is not limited to the mode shown in the above embodiment. It goes without saying that other images and sound may be output in accordance with an application (for example, a game) operated by the first information processing device 200 or the second information processing device 300.

(5) Although not shown in the above embodiment, the generation unit 212 of the first information processing device 200 may be configured to further receive sensing data from the user terminal 200 (external device) held by the user, determine the posture of a character, etc. corresponding to the user, and generating the image information and audio information as space information. For example, the user keeps his user terminal 400 in the pocket of bottoms. The user terminal 400 includes a nine-axis sensor or a six-axis sensor, and sequentially transmits the sensing data to the first information processing device 200. The first information processing device 200 can receive sensing data from the user terminal 400 and detect the motion around the user's waist from the temporal change of the received sensing data. Therefore, the motion can be reflected in the motion of the character (user) in the virtual reality space or the augmented reality space, and the generation unit 212 can generate image information and audio information in accordance with the waist motion of the character. Similarly, the second information processing device 300 may include a nine-axis sensor or a six-axis sensor and sequentially transmit the sensing data to the first information processing device 200. Then, the detection unit 211 of the first information processing device 200 can detect a motion of the head of the user on the basis of the temporal change of the sensing data received from the second information processing device 300, and reflect the motion into the motion of the character (user) in the virtual reality space or the augmented reality space, and the generation unit 212 can generate image information and audio information in accordance with the motion of the head of the character. Therefore, the first information processing device 200 can detect the motion of the head, waist, and feet of the user, and generate more realistic space information for virtual reality space or augmented reality space. Therefore, simple user's motion capture can be realized using the footwear 100, the user terminal 400 held on the waist, and the second information processing device 300 worn on the head of the user.

(6) In the above embodiment, the module 110 is provided in the tongue portion 303 of the footwear 100, but is not limited thereto. The module 110 or a part of each functional unit constituting the module 110 may be provided at a position where the sensor unit 120 is provided.

(7) In the above embodiment, shoes such as sneakers are shown as an example of the footwear 100, but this is not the only case. The footwear 100 may be any footwear as long as the user wears on the foot and includes a space in which the module 110 and the sensor unit 120 are provided. For example, as an example of the footwear 100 includes pumps and high heels for women. In these cases, the module 110, the sensor unit 120, the output unit 130, and the like may be provided inside a heel member. In addition, the footwear 100 can also be realized in other leather shoes or sandals.

(8) In the above embodiment, the upper portion 301 and the sole portion 302 of the footwear 100 may be configured to be detachable from each other. In the case of pumps for women, the upper portion and the heel portion may be configured to be detachable from each other. With such a configuration, fashionability as the footwear 100 can be improved. Further, when the output unit 130 is an LED tape, the LED tape tends to be broken more easily than other members due to expansion and contraction when the footwear 100 is used, but its maintenance becomes easy. In addition, a configuration for making the upper portion and the sole portion detachable, for example, can be realized by fitting an upper portion constituting a fastener, a hook-and-loop fastener, a screw, a binding, a recess or a protrusion, and a bottom part (a sole portion or a heel portion) constituting a protrusion or a recess or the like. In this case, when the functional parts constituting the footwear 100 are separately arranged on the upper portion and the bottom portion, it is necessary to configure them so that they can communicate with each other. For example, a communication function is also provided at the bottom so that wireless communication can be performed with a module provided at the upper portion, or a connection terminal is provided at a predetermined position of the upper portion and in contact with the bottom portion. Similar connection terminals may be provided at the bottom, and communication may be performed by wired communication by contact of these connection terminals.

(9) Although not particularly described in the above embodiment, the image generated by the generation unit 212 may be, for example, an image for displaying a street view on an actual map, in such a case, the user can go sightseeing in different places while the user is on the spot. Therefore, the information processing system 1 can also function as a system that allows the user to enjoy sightseeing while the user is on the spot.

Similarly, when the generation unit 212 generates an image indicating a specific room or place, the user can also see the other building while on the spot. Therefore, the information processing system 1 can also function as a system that allows the user to experience a preview of a rental property without moving, for example.

(10) Here, some specific examples of the method by which the generation unit 212 generates music will be described. The generation unit 212 may generate music by changing the melody when the user is walking from the sensing data from the footwear 100 and the walking speed changes from the middle. For example, when the walking speed suddenly increases or the user starts running, the generation unit 212 may change the music tempo to an up-tempo, or change the song itself to a fast-tempo song to generate music.

Alternatively, when the footwear 100 is used to take a motion lesson (for example, a walking lesson, a running lesson, a dance lesson, etc.), the generation unit 212 may be configured to determine whether the motion is suitable for the lesson, score on the basis of the motion of the footwear 100 and generate the music according to the scoring. For example, the generation unit 212 may generate music such that the higher the score, the greater the number of parts used for music (or the number of instruments).

Alternatively, the generation unit 212 may change the tone of the music to be generated every time a predetermined time has elapsed, or change the tone of the music in response to detecting a specific motion of the footwear 100 by the user. As described above, the generation unit 212 can generate various music as space information according to the motion of the foot of the user, that is, the motion of the footwear 100, and can provide various music to the user.

(11) In the above embodiment, switching between VR and AR is performed on the basis of whether or not the second information processing device 300 exists within a predetermined range, but switching between VR and AR may be made by other conditions. For example, VR and AR switching input may be performed by moving the foot as determined in advance. Further, for example, switching from VR to AR may be ignited by completion of the display of the content displayed on the second information processing device 300, or switching from VR to AR may be ignited by elapsing a predetermined time since the start of the VR display, or switching from VR to AR may be ignited by that the content displayed in VR reaches a predetermined break (for example, some learning has been completed in the content or an assigned task has been solved).

(12) In the above embodiment, the 9-axis sensor is used as an example of the sensor unit 120, but other sensors may be used as long as the user information can be acquired. For example, by providing a pressure sensor, the weight of the user can be measured by the sum of the measured values of the pressure sensors of both feet. Further, according to the pressure sensor, it is possible to specify a change in load on the foot of the user. Alternatively, the temperature sensor may be provided inside the footwear 100 to measure the approximate body temperature of the user, or the humidity sensor may be provided to measure the humidity inside the footwear 100 and on the basis of the humidity, the discomfort index for the user inside the footwear 100 may be measured. Then, information obtained from these various sensors may be sent to the first information processing device 200 or the second information processing device 300 to be reflected in the space information to be output.

(13) In the above embodiment, an example in which the second information processing device 300 is a head-mounted display is shown, but this is not limited to a head-mounted display, and any equipment installed with a device which can carry out the maximum of the space information (for example, monitor or speaker) may be used. For example, the monitor may be a large screen, or may be glasses having the functions that the second information processing device 300 has.

Figure 10:
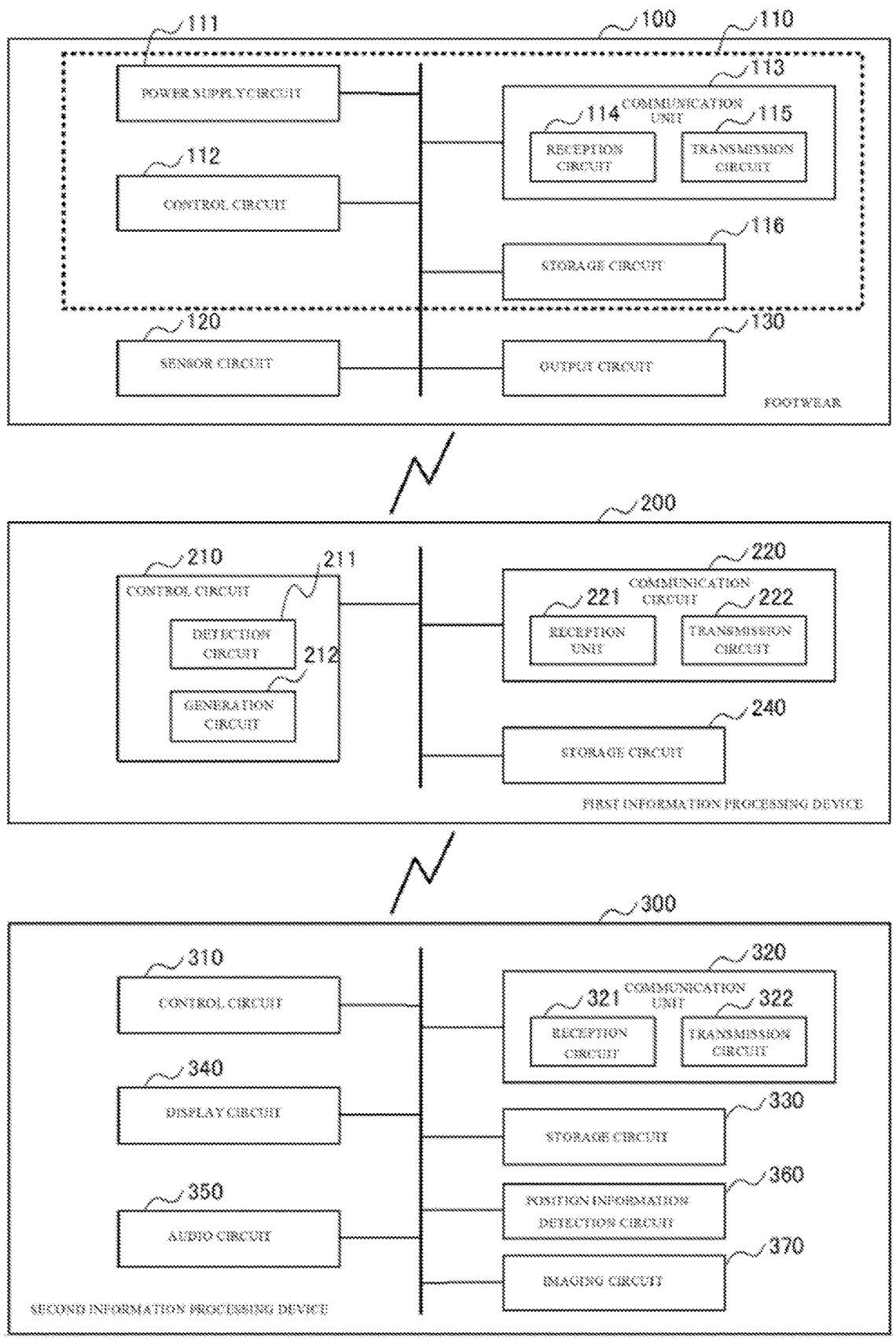
FIG. 10 is a block diagram showing a configuration of the information processing system and another configuration example of each device constituting the system.

(14) In the above embodiment, as a method for generating space information in the first information processing device, the processor of the first information processing device generates space information by executing a detection program, a generation program, or the like. However, this may be realized by a logic circuit (hardware) or a dedicated circuit formed in an integrated circuit (IC (Integrated Circuit) chip, LSI (Large Scale Integration)) or the like in the device. These circuits may be realized by one or a plurality of integrated circuits, and the functions of the plurality of functional units described in the above embodiments may be realized by a single integrated circuit. An LSI may be called a VLSI, a super LSI, an ultra LSI, or the like depending on the degree of integration. That is, as shown in FIG. 10, the footwear 100 may be configured with a power supply circuit 111, a control circuit 112, a communication circuit 113, a storage circuit 116, a sensor circuit 120, and an output circuit 130. The function is the same as each part having the same name shown in the above embodiment. Similarly, the first information processing device 200 may be configured to include a control circuit 210, a communication circuit 220, and a storage circuit 240. In addition, the second information processing device 300 may be configured to include a control circuit 310, a communication circuit 320, a storage circuit 330, a display circuit 340, an audio circuit 350, a position information detection circuit 360, and an imaging circuit 370.

The information processing program may be recorded on a processor-readable recording medium, and as the recording medium a "non-temporary tangible medium" such as a tape, a disk, a card, a semiconductor memory, or a programmable logic circuit or the like can be used. The information processing program may be supplied to the processor via any transmission medium (communication network, broadcast wave, etc.) capable of transmitting the information processing program. The present invention can also be realized in the form of a data signal embedded in a carrier wave in which the information processing program is embodied by electronic transmission.

The information processing program can be implemented using, for example, a script language such as ActionScript or JavaScript (registered trademark), an object-oriented programming language such as Objective-C or Java (registered trademark), or a markup language such as HTML5.

(15) The configuration shown in the above embodiment and the configuration shown in each supplement may be combined as appropriate. Also, as long as the results obtained are the same for each processing procedure, the execution procedures may be interchanged, or two processes may be executed in parallel.

REFERENCE SIGNS LIST

100 Footwear
110 Module
111 Power supply unit
112 Control unit
113 Communication unit
114 Reception unit
115 Transmission unit
116 Memory unit
120 Sensor unit
130 Output unit
200 First information processing device
210 Control unit
211 Detection unit
212 Generation unit
220 Communication unit
221 Reception unit
222 Transmission unit
240 Storage unit
300 Second information processing device
301 Upper portion
302 Sole portion
303 Tongue portion
310 Control unit
320 Communication unit
321 Reception unit
322 Transmission unit
330 Storage unit
340 Display unit
350 Audio unit
360 Position information detection unit
370 Imaging unit
401 Groove portion
402, 403, 404, 405 Rib
501 Dent

The invention claimed is:

1. An information processing system comprising footwear and an information processing device, wherein
the footwear is provided with a sensor to detect a motion of the footwear,
the information processing system includes:
a detection unit configured to detect the motion of the footwear on the basis of a temporal change of the sensing data; and
a generation unit configured to generate space information to be provided to a user wearing the footwear according to the motion detected by the detection unit, wherein the generation unit specifies the type of the user's motion, and generates the audio information according to a degree of appropriateness as the specified type of motion from the motion of the footwear detected by the detection unit; and
the information processing device is provided with an output unit configured to output the space information, wherein the information processing device comprises a storage unit configured to store music information for at least one music and example information that serves as an example of motion for each type of motion, wherein the generation unit generates, as the space information, space information indicating more correct music as the music information as the motion of the footwear is closer to an ideal walking motion, and generates space information indicating a music with more noise added to the music information as the sensing data is farther from the ideal walking motion, wherein the output unit is a speaker, and wherein the space information is audio information emitted in a virtual reality space or an augmented reality space.

2. The information processing system according to claim 1, wherein the footwear further includes
a transmission unit configured to transmit sensing data detected by the sensor to the information processing device, and
the information processing device further includes:
a reception unit configured to receive the sensing data;
the detection unit; and
the generation unit.

3. The information processing system according to claim 1, wherein
the output unit is a monitor;
the space information is image information indicating a virtual reality space or an augmented reality space, and
the generation unit generates, as the image information, an image indicating a character operated by the user or a view shown in the field of view of the user.

4. The information processing system according to claim 3, wherein
the information processing device includes an acceptation unit configured to accept designation information for designating whether the generation unit generates the space information for the virtual reality space or the space information for the augmented reality space as the space information generated by the generation unit, and
the generation unit generates space information according to the designation information.

5. The information processing system according to claim 4, wherein the information processing device further includes:

a position information acquisition unit configured to acquire position information indicating a current position of the own device;

a designation information generation unit configured to generate designation information for designating generation of space information for the virtual reality space when the position information is included within a predetermined range that is determined in advance, and configured to generate designation information for designating generation of space information for the augmented reality space when the position information is not included within a predetermined range that is determined in advance, and the acceptation unit accepts the designation information generated by the designation information generation unit.

6. The information processing system according to claim 4, wherein the information processing system comprises another information processing device, a designation information generation unit configured to generate designation information that designates whether the generation unit generates space information for augmented reality space, or the space information for the virtual reality space according to whether the device using the space information generated by the generation unit is the information processing device or the other information processing device, and the acceptation unit accepts the designation information generated by the designation information generation unit.

7. The information processing system according to claim 4, wherein the generation unit generates the space information using different conversion coefficients between the sensing data and the virtual reality space and the augmented reality space according to the designation information.

8. The information processing system according to claim 3, wherein the generation unit generates image information of an interaction with an object that appears in the virtual reality space or the augmented reality space according to the motion of the footwear.

9. The information processing system according to claim 3, wherein the information processing device is a wearable terminal used by a user wearing on a head thereof.

10. The information processing system according to claim 3, wherein the information processing system further includes an external device, the external device includes:

an acquisition unit configured to acquire information about the user;

a transmission unit configured to transmit information about the user acquired by the acquisition unit to the information processing device; and the generation unit further generates the space information on the basis of information about the user transmitted from the external device.

11. The information processing system according to claim 10, wherein the acquisition unit acquires information related to a motion of parts other than foot of the user.

12. The information processing system according to claim 3, wherein the footwear further includes a light emitting unit configured to emit light according to the motion of the footwear, and the generation unit generates space information indicating that the footwear worn by the character of the user in the virtual space is caused to emit light in the same manner as the light emitting unit.

13. The information processing system according to claim 1, wherein the space information includes image information indicating the virtual reality space or the augmented reality space, the image information includes an object to be displayed in the virtual reality space or the augmented reality space, and the generation unit generates space information including the predetermined audio when a character operated by the user or the user touches the object according to the motion of the footwear.

14. The information processing system according to claim 1, wherein the generation unit generates music, as the space information, as the audio information according to the motion of the footwear, and changes the music tone of the music according to the predetermined motion of the footwear.

15. The information processing system according to claim 3, wherein the generation unit generates the space information including stimulus information for specifying a stimulus to be given to the user according to an action to a character operated by the user or the user in the virtual reality space or the augmented reality space, and the footwear comprises:

a reception unit configured to receive the space information including the stimulus information; and a stimulus unit configured to give a bodily sensation stimulus to the user on the basis of the stimulus information.

16. A method comprising:

detecting a motion of a footwear using a temporal change of a sensing data generated by a sensor disposed in the footwear;

a generating space information to be provided to a user wearing the footwear according to the detected motion;

generating an audio information via a speaker according to a degree of appropriateness of the detection motion;

outputting the space information; and storing music information for at least one music and example information that serves as an example of motion for each type of motion, wherein the space information indicates more correct music as the music information as the motion of the footwear is closer to an ideal walking motion, and wherein the space information indicates a music with more noise added to the music information as the sensing data is farther from the ideal walking motion, and wherein the space information is audio information emitted in a virtual reality space or an augmented reality space.

17. A computer-readable non-transitory recording medium comprising instruction which when executed by a processor causes the processor to:

receive sensing data from a sensor disposed in a footwear adapted to detect a motion of the footwear on the basis of a change in time of the sensing data;

generate space information to be provided to a user wearing the footwear according to the detected motion;

generate an audio information via a speaker according to a degree of appropriateness of the detection motion;

output the space information and store music information for at least one music and example information that serves as an example of motion for each type of motion, wherein the space information indicates more correct music as the music information as the motion of the footwear is closer to an ideal walking motion, and wherein the space information indicates a music with more noise added to the music information as the sensing data is farther from the ideal walking motion, and wherein the space information is audio information emitted in a virtual reality space or an augmented reality space.

\* \* \* \* \*